United States Patent
Baldwin

(10) Patent No.: US 8,720,290 B2
(45) Date of Patent: May 13, 2014

(54) VEHICLE WITH DUAL CLUTCH TRANSMISSION

(75) Inventor: Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/464,148

(22) Filed: May 4, 2012

(65) Prior Publication Data

US 2013/0291670 A1     Nov. 7, 2013

(51) Int. Cl.
*F16H 3/08*     (2006.01)
(52) U.S. Cl.
USPC ............................................................ 74/330
(58) Field of Classification Search
USPC ................................................ 74/330, 331, 333
See application file for complete search history.

(56) References Cited

U.S. PATENT DOCUMENTS

| | | | |
|---|---|---|---|
| 6,958,028 B2 | 10/2005 | Janson et al. | |
| 7,246,536 B2 | 7/2007 | Baldwin | |
| 7,469,609 B2 | 12/2008 | Baldwin | |
| 7,748,286 B2 | 7/2010 | Baldwin | |
| 7,896,770 B2 * | 3/2011 | Earhart et al. | 475/218 |
| 8,038,564 B2 * | 10/2011 | Earhart et al. | 475/218 |
| 2007/0113693 A1 * | 5/2007 | Chen | 74/331 |
| 2010/0257967 A1 * | 10/2010 | Rieger et al. | 74/331 |
| 2010/0269611 A1 * | 10/2010 | Rieger | 74/331 |
| 2011/0030488 A1 * | 2/2011 | Gumpoltsberger et al. | 74/331 |

* cited by examiner

*Primary Examiner* — Ha D Ho
(74) *Attorney, Agent, or Firm* — James Dottavio; Brooks Kushman P.C.

(57) ABSTRACT

A dual clutch transaxle provides eight forward gear ratios and two reverse gear ratios. The gears are arranged in seven gear planes. Four coupler assemblies are arranged to selectively sequentially engage each adjacent pair of the eight forward gear ratios to permit shifting among the eight forward gear ratios with continuous transmission of torque through the transaxle.

14 Claims, 11 Drawing Sheets

VEHICLE WITH DUAL CLUTCH TRANSMISSION

TECHNICAL FIELD

This disclosure relates to the field of automatic transmissions for motor vehicles. More particularly, the disclosure pertains to an arrangement of gears, clutches, couplers, and the interconnections among them in a power transmission.

BACKGROUND

Dual clutch transmissions are a type of transmission employing two input clutches which connect a pair of input shafts to the prime mover, typically an internal combustion engine. One clutch is used for odd numbered gears and the other clutch is used for even numbered gears. Couplers establish power flow paths between the input shafts and the transmission output. While the vehicle is driving in an odd numbered gear, the couplers for the even numbered gears may be manipulated to select the next higher or lower gear ratio, and vice versa.

DETAILED DESCRIPTION

Figure 1:
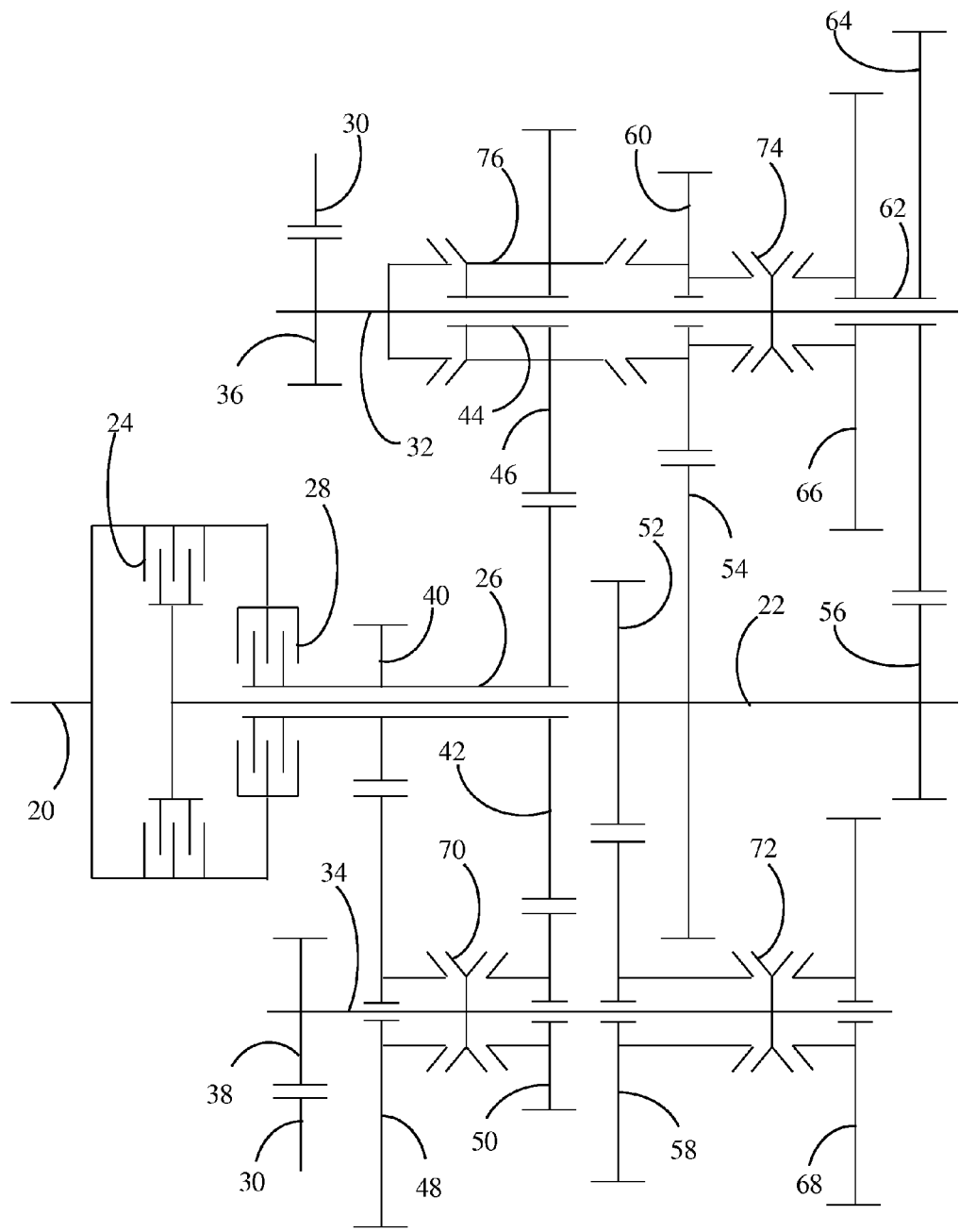
FIG. 1 is a schematic diagram of a dual clutch transmission.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automobile manufacturers are under increasing pressure to improve the fuel efficiency of vehicles. One means of improving fuel efficiency is utilizing transmissions with more speed ratios, thereby operating the engine closer to its most efficient speed at various vehicle speeds. Generally, increasing the number of available speed ratios requires making the transmission physically longer. However, automobile manufacturers are also under pressure to reduce the width of the engine compartment. For transverse mounted powertrains, this severely constrains the ability to use a longer transmission.

A transmission that is designed to be mounted transversely in the vehicle is called a transaxle. The input axis of a transaxle is typically aligned with the axis of the engine crankshaft. The output axis is offset such that it is close to the axis of one set of wheels. A transaxle can include a differential assembly mounted on the output axis, which allows the wheels to rotate at slightly different speeds relative to one another to accommodate the greater distance that the outside wheel must travel during a turn.

Two components are fixed to one another when they are constrained to rotate as a unit in all operating conditions. Components can be fixed by a spline connection, welding, press fitting, machining from a common solid, or other means. In contrast, two components are selectively coupled by a coupler when they are constrained to rotate as a unit whenever the coupler is fully engaged and they are free to rotate at distinct speeds in at least some other operating condition. Selective coupling can be accomplished by means of a friction clutch, a dog clutch, a synchronizer, or other means.

Dual clutch transaxles typically utilize parallel axis gears, sometimes called layshaft gearing, to transfer power between the input shafts and the output axis. A dual clutch transaxle typically includes one or more layshafts which are located on axes offset from both the input shaft axis and the output axis. A small gear, called a pinion, is usually fixed to each layshaft and meshes with a large gear, called the output gear, which is fixed to the differential assembly. In common arrangements, each gear ratio corresponds to a pair of gears, one on the input axis and the other on the layshaft axis. Typically, one of the gears is fixed to a shaft while the other is free to rotate about a shaft until a coupler is engaged, fixing it to the shaft. Couplers are often combined in coupler assemblies that include a sliding sleeve which is positioned by a fork. When the sleeve is pushed in one direction, one gear is coupled to a shaft. When the sleeve is pushed in the opposite direction, a different gear is coupled to the shaft. When the sleeve is positioned in the middle, both gears are free to rotate at different speeds relative to the shaft and to each other.

A factor in determining the length of a transaxle can be the number of separate planes of gears. Each additional plane of gears increases the length of the transmission by the width of the gears and any required clearance. A transaxle can have one plane of gears for the pinions and output gear plus one plane of gears for every gear ratio, including reverse. Thus, a transmission with eight forward gear ratios and one reverse gear ratio would have ten planes of gears if built according to the conventional arrangement. One technique for minimizing the number of planes is utilizing a single gear on the input axis meshing with gears on two different layshafts. This achieves two gear ratios with a single plane of gears. A disadvantage of this technique, however, can be that it restricts the freedom to select gear sizes in order to establish the desired progression of gear ratios.

A high speed ratio between the input shaft and the output can maximize vehicle performance and reduce the amount of energy that the input clutch must absorb during a vehicle launch. In the typical arrangement described above, the maximum gear ratio achievable is restricted by the minimum physical size of a gear on the input axis. Similarly, the minimum gear ratio achievable is restricted by the minimum physical size of a gear on the layshaft axis. A low speed ratio in top gear is desirable to allow the engine to operate near its most efficient speed while cruising on the highway.

An example transmission is schematically illustrated in FIG. 1. Transmission input 20 is driveably connected to an engine, preferably via some form of torsional damper. Solid input shaft 22 is selectively coupled to the transmission input 20 by even clutch 24. Hollow input shaft 26 is positioned co-axially with solid input shaft 22 and is selectively coupled to the transmission input 20 by odd clutch 28. Even clutch 24 and odd clutch 28 are preferably friction clutches capable of transmitting torque between elements that are rotating at different speeds. Either wet or dry friction clutches are applicable.

Figure 2:
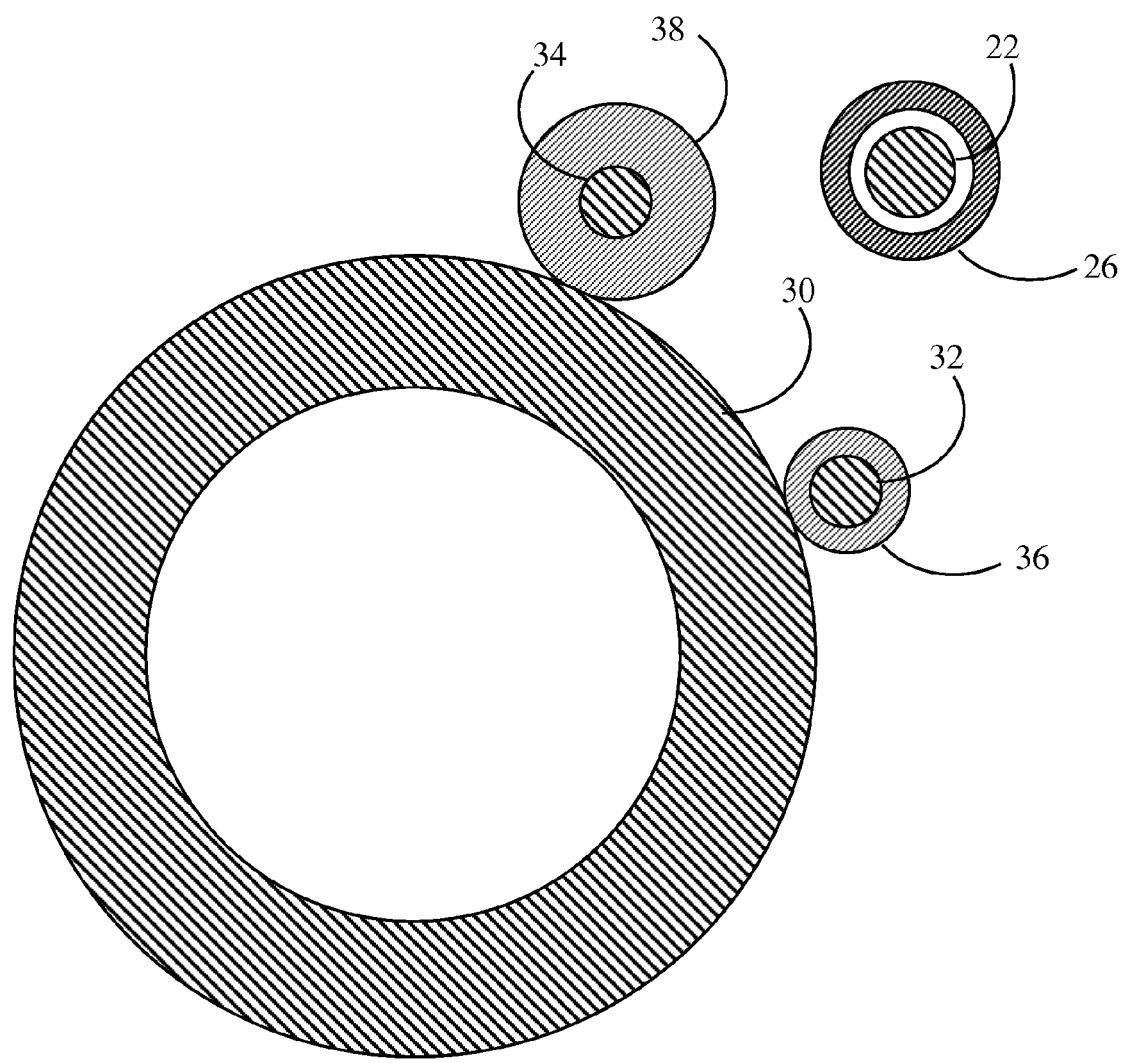
FIG. 2 is a cross-sectional view of a first gear plane of the transmission of FIG. 1.

Output gear 30 is driveably connected to the vehicle wheels, preferably via a differential assembly that permits some difference in wheel speed. Two layshafts 32 and 34 are supported on axes parallel to transmission input 20. Pinion gear 36 is fixed to layshaft 32 and in continuous meshing engagement with output gear 30. Similarly, pinion gear 38 is fixed to layshaft 34 and in continuous meshing engagement with output gear 30. FIG. 2 shows a cross section through the pinion gears and illustrates the relationships among the various axes of rotation.

Figure 3:
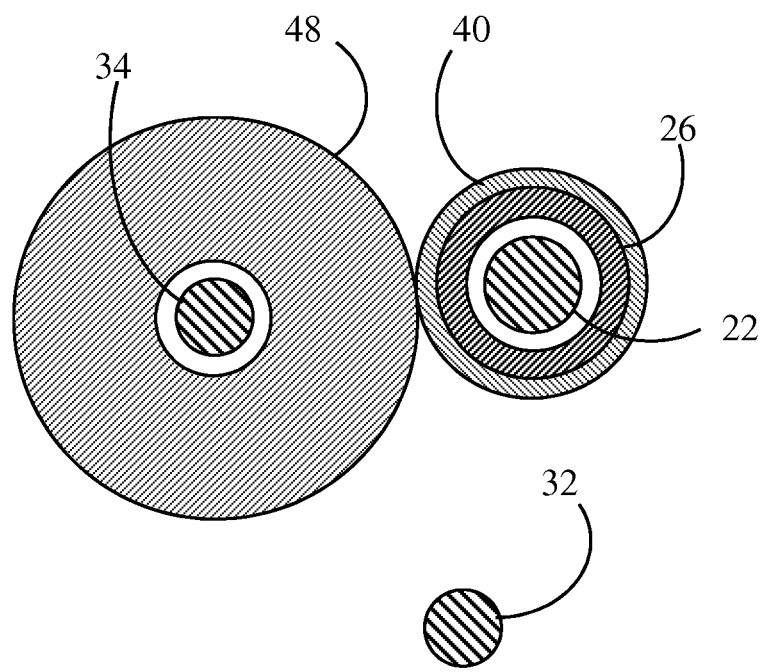
FIG. 3 is a cross-sectional view of a second gear plane of the transmission of FIG. 1.
Figure 4:
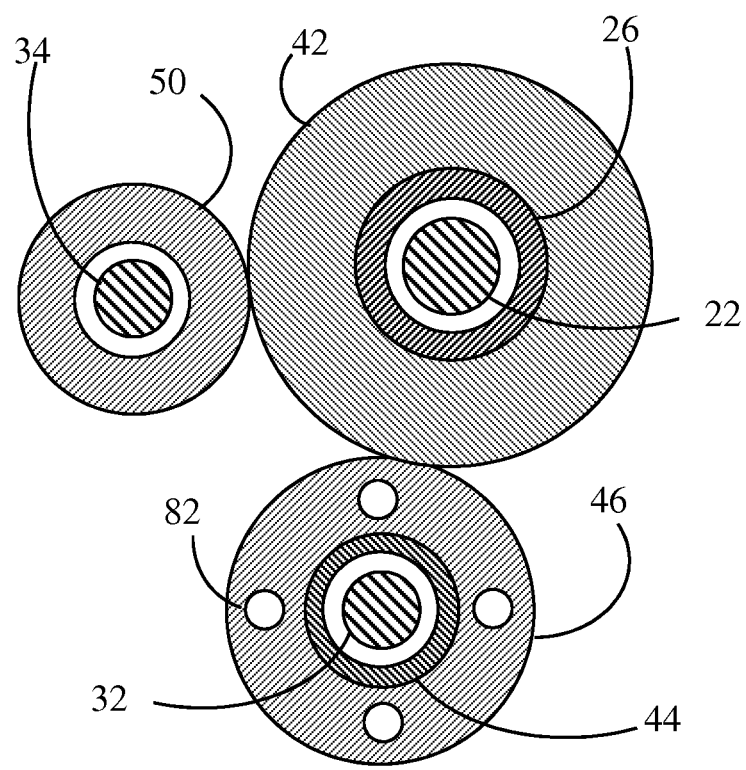
FIG. 4 is a cross-sectional view of a third gear plane of the transmission of FIG. 1.
Figure 5:
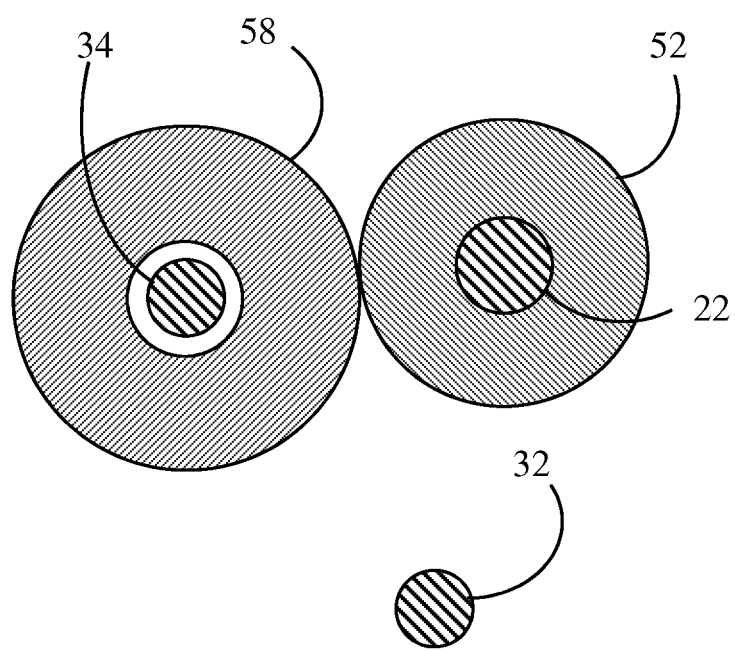
FIG. 5 is a cross-sectional view of a fourth gear plane of the transmission of FIG. 1.
Figure 6:
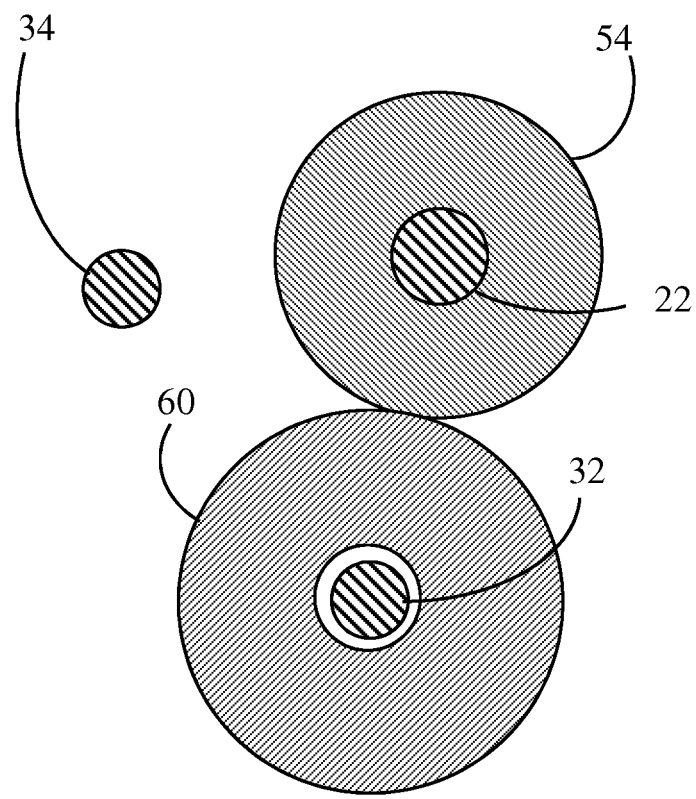
FIG. 6 is a cross-sectional view of a fifth gear plane of the transmission of FIG. 1.
Figure 7:
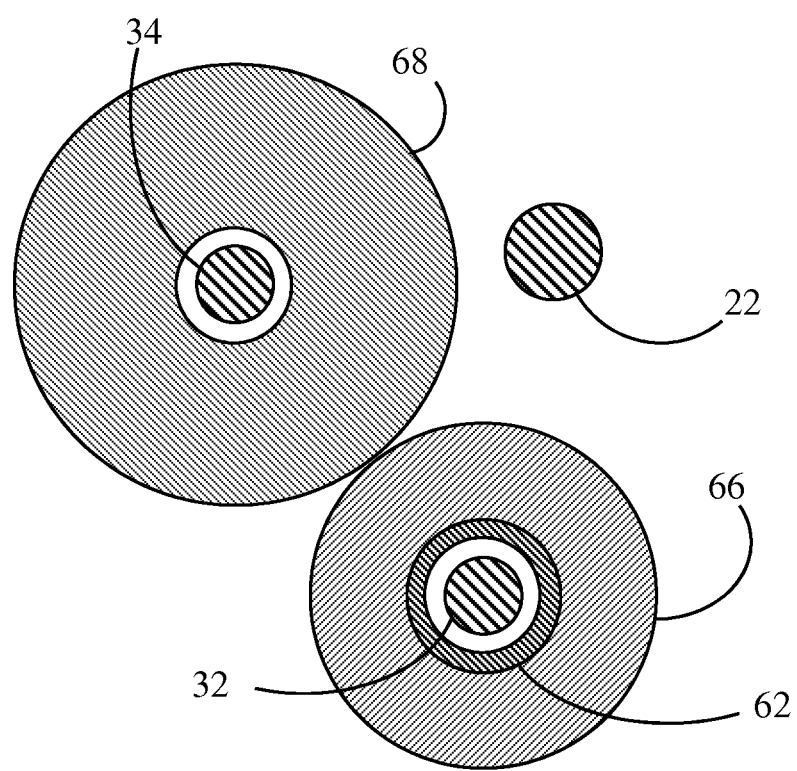
FIG. 7 is a cross-sectional view of a sixth gear plane of the transmission of FIG. 1.
Figure 8:
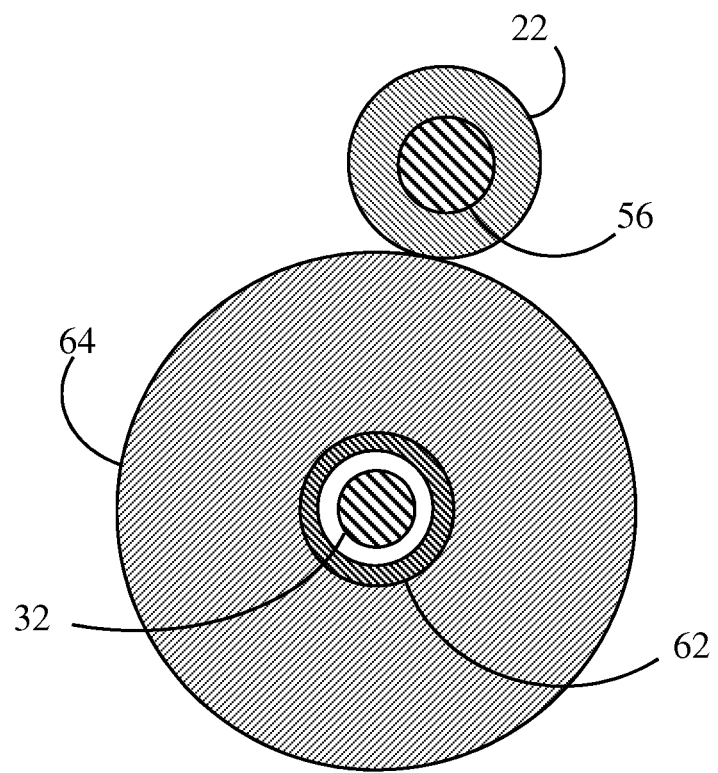
FIG. 8 is a cross-sectional view of a seventh gear plane of the transmission of FIG. 1.

Gears 40 and 42 are fixed to hollow input shaft 26. Hollow intermediate shaft 44 is supported for rotation on layshaft 32. Gear 46 is fixed to intermediate shaft 44 and is in continuous meshing engagement with gear 42. Gears 48 and 50 are supported for rotation about layshaft 34 and are in continuous meshing engagement with gears 40 and 42 respectively. These gears are illustrated in cross section in FIGS. 3 and 4. Gears 52, 54, and 56 are fixed to solid input shaft 22. Gear 58 is supported for rotation about layshaft 34 and is in continuous meshing engagement with gear 52 as shown in FIG. 5. Gear 60 is supported for rotation about layshaft 32 and is in continuous meshing engagement with gear 54 as shown in FIG. 6. Hollow intermediate shaft 62 is supported for rotation on layshaft 32. Gear 64 is fixed to intermediate shaft 62 and is in continuous meshing engagement with gear 56 as shown in FIG. 8. Finally, gear 66 is fixed to intermediate shaft 62. Gear 68 is supported for rotation about layshaft 34 and is in continuous meshing engagement with gear 66 as shown in FIG. 7.

Coupler assembly 70 can be a synchronizer assembly as typically used in manual transmissions. Coupler 70 includes a hub fixed to layshaft 34. The hub supports a sliding sleeve which can be moved axially by an external fork. When the sleeve is moved toward the transmission input, teeth on the hub are forced into engagement with teeth on gear 48, forcing gear 48 to rotate with layshaft 34. When the sleeve is moved in the opposite direction, teeth on the hub are forced into engagement with teeth on gear 50, forcing gear 50 to rotate with layshaft 34. When the sleeve is in a central position, layshaft 34, gear 48, and gear 50 are free to rotate at distinct (different) speeds. Similarly, coupler assembly 72 selectively couples gears 58 and 68 to layshaft 34 and coupler 74 couples gear 60 and intermediate shaft 62 to layshaft 32.

Figure 9:
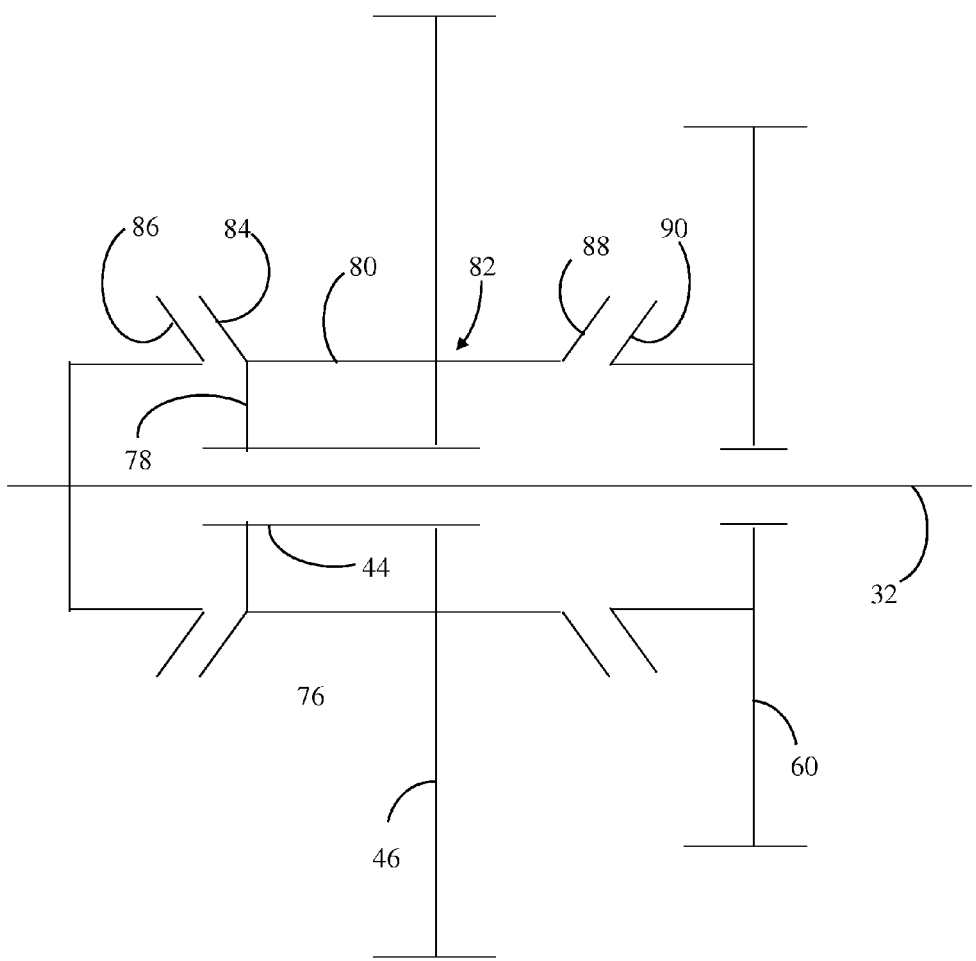
FIG. 9 is a schematic diagram of one of the coupler assemblies of the transmission of FIG. 1.

Coupler assembly 76 selectively couples gear 46 to either layshaft 32 or gear 60. The structure of coupler assembly 76 is illustrated in FIG. 9. Hub 78 is fixed to intermediate shaft 44 and supports sleeve 80. A portion of sleeve 80 extends through a set of holes 82 in gear 46. These holes are also shown in FIG. 4. When the sleeve is moved toward the transmission input, teeth 84 fixed to intermediate shaft 44 are forced into engagement with teeth 86 fixed to layshaft 32, forcing gear 46 to rotate with layshaft 32. When the sleeve is moved in the opposite direction, teeth 88 fixed to intermediate shaft 44 are forced into engagement with teeth 90 fixed to gear 60, forcing gears 46 and 60 to rotate as a unit. When the sleeve is in a central position, layshaft 32, gear 46, and gear 60 are free to rotate at distinct speeds.

Figure 10:
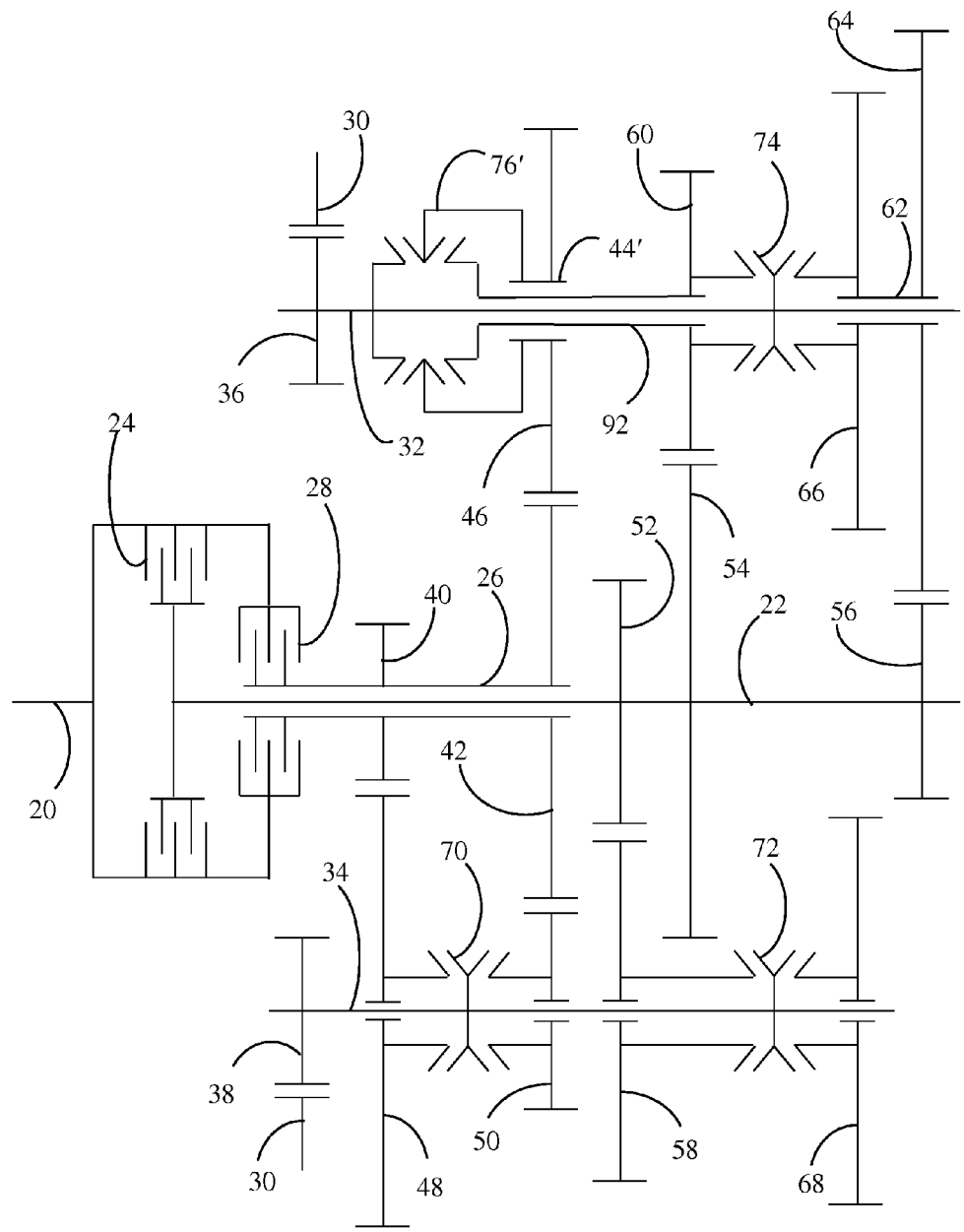
FIG. 10 is a schematic diagram of another dual clutch transmission.
Figure 11:
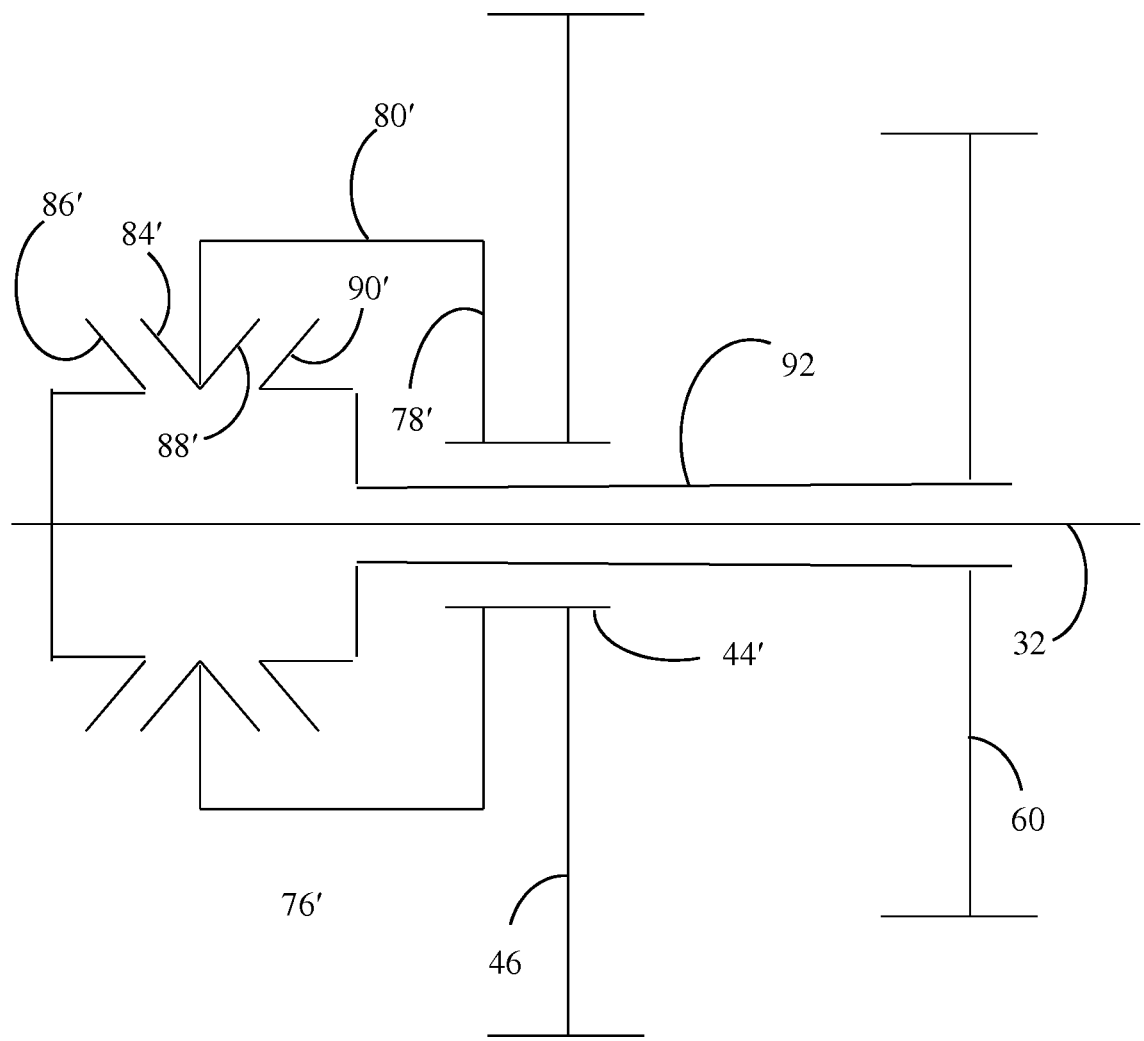
FIG. 11 is a schematic diagram of one of the coupler assemblies of the transmission of FIG. 10.

Another example transmission is illustrated in FIGS. 10 and 11. Coupler assembly 76' selectively couples gear 46 to either layshaft 32 or gear 60. Intermediate shaft 92 is supported for rotation about layshaft 32 and fixed to gear 60. Intermediate shaft 44' is supported for rotation about intermediate shaft 60' and fixed to gear 46. Hub 78' is fixed to intermediate shaft 44 and supports sleeve 80'. When the sleeve is moved toward the transmission input, teeth 84' fixed to intermediate shaft 44' are forced into engagement with teeth 86' fixed to layshaft 32, forcing gear 46 to rotate with layshaft 32. When the sleeve is moved in the opposite direction, teeth 88' fixed to intermediate shaft 44' are forced into engagement with teeth 90' fixed to intermediate shaft 92, forcing gears 46 and 60 to rotate as a unit. When the sleeve is in a central position, layshaft 32, gear 46, and gear 60 are free to rotate at distinct speeds.

A suggested number of gear teeth and approximate pitch radius for each gear are listed in Table 1.

TABLE 1

| # | Used In | Teeth | Radius (mm) |
|---|---------|-------|-------------|
| 30 | all | 83 | 113.23 |
| 36 | $1^{st}, 2^{nd}, 5^{th}, 6^{th}$ | 17 | 23.19 |
| 38 | R1, R2, $3^{rd}, 4^{th}, 7^{th}, 8^{th}$ | 21 | 28.65 |
| 40 | $3^{rd}$ | 19 | 22.91 |
| 42 | R1, $1^{st}, 5^{th}, 7^{th}, 8^{th}$ | 69 | 47.15 |
| 46 | R1, $1^{st}, 5^{th}, 8^{th}$ | 67 | 45.78 |
| 48 | $3^{rd}$ | 49 | 59.09 |
| 50 | $7^{th}, 8^{th}$ | 51 | 34.85 |
| 52 | $4^{th}$ | 23 | 30.42 |
| 54 | R1, $1^{st}, 6^{th}$ | 38 | 52.71 |
| 56 | R1, R2, $1^{st}, 2^{nd}$ | 18 | 21.17 |
| 58 | $4^{th}$ | 39 | 51.58 |
| 60 | R1, $1^{st}, 6^{th}, 8^{th}$ | 29 | 40.22 |
| 64 | R1, R2, $1^{st}, 2^{nd}$ | 61 | 71.76 |
| 66 | R1, R2 | 42 | 50.97 |
| 68 | R1, R2 | 47 | 57.03 |

The corresponding gear ratios and step sizes are listed in Table 2.

TABLE 2

| | Clutch | Couplers | Gears | Ratio | Step |
|---|--------|----------|-------|-------|------|
| R1 | 28 | 72R, 76R | 42-46-60-54-56-64-66-68-36-30 | −19.07 | 91% |
| R2 | 24 | 72R | 56-64-66-68-36-30 | −15.01 | 1.27 |
| $1^{st}$ | 28 | 74R, 76R | 42-46-60-54-56-64-36-30 | 21.05 | |
| $2^{nd}$ | 24 | 74R | 56-64-36-30 | 16.55 | 1.27 |
| $3^{rd}$ | 28 | 70L | 40-48-38-30 | 10.19 | 1.62 |
| $4^{th}$ | 24 | 72L | 52-58-38-30 | 6.70 | 1.52 |
| $5^{th}$ | 28 | 76L | 42-46-36-30 | 4.74 | 1.41 |
| $6^{th}$ | 24 | 74L | 54-60-36-30 | 3.73 | 1.27 |
| $7^{th}$ | 28 | 70R | 42-50-38-30 | 2.92 | 1.28 |
| $8^{th}$ | 24 | 70R, 76R | 54-60-46-42-50-38-30 | 2.30 | 1.27 |

Table 2 also indicates which clutch is applied and which couplers must be engaged to select each gear ratio. A number of gears are used in a variety of gear ratios. In addition to establishing the power paths for fifth and sixth gear, gears 42, 46, 60, and 54 also establish a power path between the first and second input shafts whenever gear 46 is coupled to gear 60 by coupler assembly 76. This power path between the input shafts is used in conjunction with the second gear power path to establish the first gear power path. As a result, the achievable first gear ratio is higher than would be achievable with a conventional arrangement. Also, this power path between the input shafts is used in conjunction with the seventh gear power path to establish an eighth gear power path with a lower gear ratio than would be achievable with a conventional arrangement. Consequently, first gear and eighth gear do not require any additional gears beyond those that are present for second, fifth, sixth, and seventh gears, reducing the number of gear planes relative to a conventional arrangement.

The transmission is prepared for forward vehicle movement by coupling gear 64 to layshaft 32 via coupler assembly 74 and coupling gear 46 to gear 60 via coupler assembly 76. In this configuration, the speed of solid input shaft 22 is related to the speed of the output by the second gear ratio. In addition, the speed of the hollow input shaft is related to the speed of the solid input shaft by the ratio of the fifth gear and sixth gear ratios. Consequently, the first gear ratio is the product of the second gear ratio and the ratio of the fifth and sixth gear ratios.

From this state, the vehicle can be launched in first gear by gradually engaging clutch 28 or the vehicle can be launched in second gear by gradually engaging clutch 24. Launching in first gear will result in better acceleration. However, the very high gear ratio can result in a very early shift from first gear to second gear which drivers could find annoying. On the other hand, launching in second gear will result in reduced acceleration and will increase the amount of heat that must be absorbed by the clutch and eventually dissipated to the environment. Using clutches 28 and 24 in conjunction addresses these issues. Initially, clutch 28 is used for performance reasons. Gradually, the torque capacity of clutch 24 is increased and the torque capacity of clutch 28 is decreased such that the torque capacity of clutch 28 is zero by the time the hollow input shaft 26 reaches the input speed. From that point, the launch is completed in second gear using clutch 24. This control strategy has the additional benefit of dividing the heat between the two clutches.

As the vehicle continues in second gear with clutch 24 engaged, coupler assembly 76 is disengaged and gear 48 is coupled to layshaft 34 via coupler assembly 70. The shift from second to third is accomplished by gradually releasing clutch 24 while gradually engaging clutch 28. Similarly, while the transmission is in third gear, coupler assembly 74 is disengaged and gear 58 is coupled to layshaft 34 via coupler assembly 72. The shift from third to fourth is accomplished by gradually releasing clutch 28 while gradually engaging clutch 24. This pattern continues up through seventh gear with each odd numbered gear selected while driving in an even numbered gear and each even numbered gear selected while driving in an odd numbered gear. Fifth gear is selected by coupling gear 46 to layshaft 32 via coupler assembly 76. Sixth gear is selected by coupling gear 60 to layshaft 32 via coupler assembly 74. Similarly, seventh gear is selected by coupling gear 50 to layshaft 34 via coupler assembly 70. Finally, to engage eighth gear, gear 46 is coupled to gear 60 via coupler assembly 76 while seventh gear remains engaged. Consequently, the eighth gear ratio is equal to the seventh gear ratio divided by the ratio of the fifth and sixth gear ratios.

Downshifts are accomplished similarly. In general, any even numbered gear ratio can be selected while driving in any odd numbered gear ratio except first gear. Once an even numbered gear ratio is selected, a shift to that ratio is accomplished by gradually releasing clutch 28 while gradually engaging clutch 24. Similarly, any odd numbered gear ratio can be selected while driving in any even numbered gear ratio except eighth gear. Once an odd numbered gear ratio is selected, a shift to that ratio is accomplished by gradually releasing clutch 24 while gradually engaging clutch 28.

The transmission is prepared for reverse vehicle movement by coupling gear 68 to layshaft 34 via coupler assembly 72 and coupling gear 46 to gear 60 via coupler assembly 76. As with forward launch, the vehicle can be launched in reverse by gradually engaging clutch 24, clutch 28, or some combination of the two.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A dual clutch transaxle comprising:
    a plurality of gears arranged in no more than seven gear planes;
    first and second input shafts;
    an output; and
    four sliding sleeves configured to actuate a plurality of couplers to selectively engage eight forward gear ratios and a reverse gear ratio and to permit shifting between all adjacent forward gear ratios with continuous transmission of torque through the transaxle, wherein the plurality of gears and the plurality of couplers includes a selectable power path between the first and second input shafts, wherein the power path constrains the first and second input shafts to rotate at a speed ratio not equal to one and does not constrain the speed of the output, and wherein the selectable power path is selected to establish the highest and the lowest of the eight forward gear ratios.

2. A dual clutch transmission comprising:
    a first and a second input shaft, the input shafts selectively coupled to a transaxle input by first and second friction clutches respectively;
    an output;
    a collection of gears arranged in no more than six planes wherein at least four of the gear planes have at most two gears; and
    a collection of couplers, the gears and couplers configured to establish (i) a first selectable power path between the first input shaft and the second input shaft, the second input shaft rotating faster than the first input shaft whenever the first power path is selected, (ii) second, fourth, and sixth selectable power paths between the first input shaft and the output, the second, fourth, and sixth power paths establishing second, fourth, and sixth speed ratios between the first input shaft and the output respectively, the second speed ratio greater than the fourth and sixth speed ratios, the second power path simultaneously selectable with the first power path, and (iii) third, fifth, and seventh selectable power paths between the second input shaft and the output, the third, fifth, and seventh power paths establishing third, fifth, and seventh speed ratios between the second input shaft and the output respectively, the seventh speed ratio less than the third and fifth speed ratios, the seventh power path simultaneously selectable with the first power path, the third, fifth, and seventh power paths all simultaneously selectable with any of the second, fourth, and sixth power paths.

3. The transmission of claim 2 wherein each of the first through seventh power paths are selected by engaging a single one of the couplers.

4. The transmission of claim 2 further comprising a sliding sleeve configured such that sliding the sleeve in a first direction selects the first power path and sliding the sleeve in a second direction selects the fifth power path.

5. The transmission of claim 2 further comprising a sliding sleeve configured such that sliding the sleeve in a first direction selects the second power path and sliding the sleeve in a second direction selects the sixth power path.

6. The transmission of claim 2 further comprising a sliding sleeve configured such that sliding the sleeve in a first direction selects the seventh power path and sliding the sleeve in a second direction selects the third power path.

7. The transmission of claim 2 further comprising additional gears and an additional coupler establishing an eighth selectable power path between the first input shaft and the output, wherein the eighth power path establishes a negative speed ratio between the first input shaft and the output.

8. The transmission of claim 7 further comprising a sliding sleeve configured such that sliding the sleeve in a first direction selects the eighth power path and sliding the sleeve in a second direction selects the fourth power path.

9. A transmission comprising:
a first layshaft;
a first and second gear each supported for rotation about the layshaft;
a first sliding sleeve configured to, in different positions, i) couple the first gear to the layshaft, ii) couple the first gear to the second gear, and iii) decouple the first gear from the layshaft and the second gear; and
a second sliding sleeve configured to selectively couple the second gear to the layshaft.

10. The transmission of claim 9 wherein the first sliding sleeve extends through the first gear.

11. The transmission of claim 9 further comprising a hollow intermediate shaft extending through the first gear and wherein the second gear is fixed to the hollow intermediate shaft.

12. The transmission of claim 9 further comprising
first and second input shafts;
a third gear fixed to the first input shaft and in continuous meshing engagement with the first gear; and
a fourth gear fixed to the second input shaft and in continuous meshing engagement with the second gear.

13. The transmission of claim 12 further comprising
a transmission input configured to be driven by a vehicle engine;
first and second friction clutches selectively coupling the transmission input to the first and second input shafts respectively;
an output gear configured to drive vehicle wheels; and
an output pinion fixed to the layshaft and in continuous meshing engagement with the output gear.

14. The transmission of claim 13 further comprising
a plurality of selectable power paths between the first input shaft and the output gear; and
a plurality of selectable power paths between the second input shaft and the output gear.

* * * * *